United States Patent [19]

Bredow

[11] 4,334,225
[45] Jun. 8, 1982

[54] ANTENNA SYSTEM FOR LOCATING A MICROWAVE SIGNAL SOURCE

[75] Inventor: Reinhard Bredow, Gauting, Fed. Rep. of Germany

[73] Assignee: Siemens Aktiengesellschaft, Berlin & Munich, Fed. Rep. of Germany

[21] Appl. No.: 145,709

[22] Filed: May 1, 1980

[30] Foreign Application Priority Data

Jul. 19, 1979 [DE] Fed. Rep. of Germany ....... 2929254

[51] Int. Cl.³ ..................... H04B 7/00; H01Q 13/00
[52] U.S. Cl. ........................ 343/100 LE; 343/777; 343/778; 343/854
[58] Field of Search ............... 343/100 LE, 777, 778, 343/854

[56] References Cited

U.S. PATENT DOCUMENTS 3,213,446 10/1965 Voyner ..................... 343/100 LE
3,916,414 10/1975 Trigon et al. ............. 343/100 LE
4,007,461 2/1977 Lueotke et al. ............ 343/113 R

FOREIGN PATENT DOCUMENTS 807101 7/1949 Fed. Rep. of Germany .

Primary Examiner—S. C. Buczinski
Attorney, Agent, or Firm—Hill, Van Santen, Steadman, Chiara & Simpson

[57] ABSTRACT

An antenna system for locating a microwave signal source utilizing two directional finding antennas (1,2) which have major radiation lobes (3,4) which are identical and are angularly offset relative to each other in the bearing plane but overlap so that the angular position of the signal source can be identified within the overlapping range of the lobes of the two antenna by using signal level comparison or ratio formation of two signal voltages received from the two antennas (1,2). False or ambiguous bearings occurring from side lobes which overlap are avoided by the use of a pair of auxiliary radiators (13, 14) which are associated with each of the primary directional finding antennas (1,2) and wherein the primary radiation direction of the auxiliary radiators are offset in the bearing plane by a specific angle relative to the direction of the primary direction finding antennas. The result is that the radiation level of each of the direction finding antennas (1,2) is accentuated on one side relative to the primary radiation direction. The antenna system with the present invention are also useful in intelligence radio transmitting and receiving systems.

8 Claims, 7 Drawing Figures

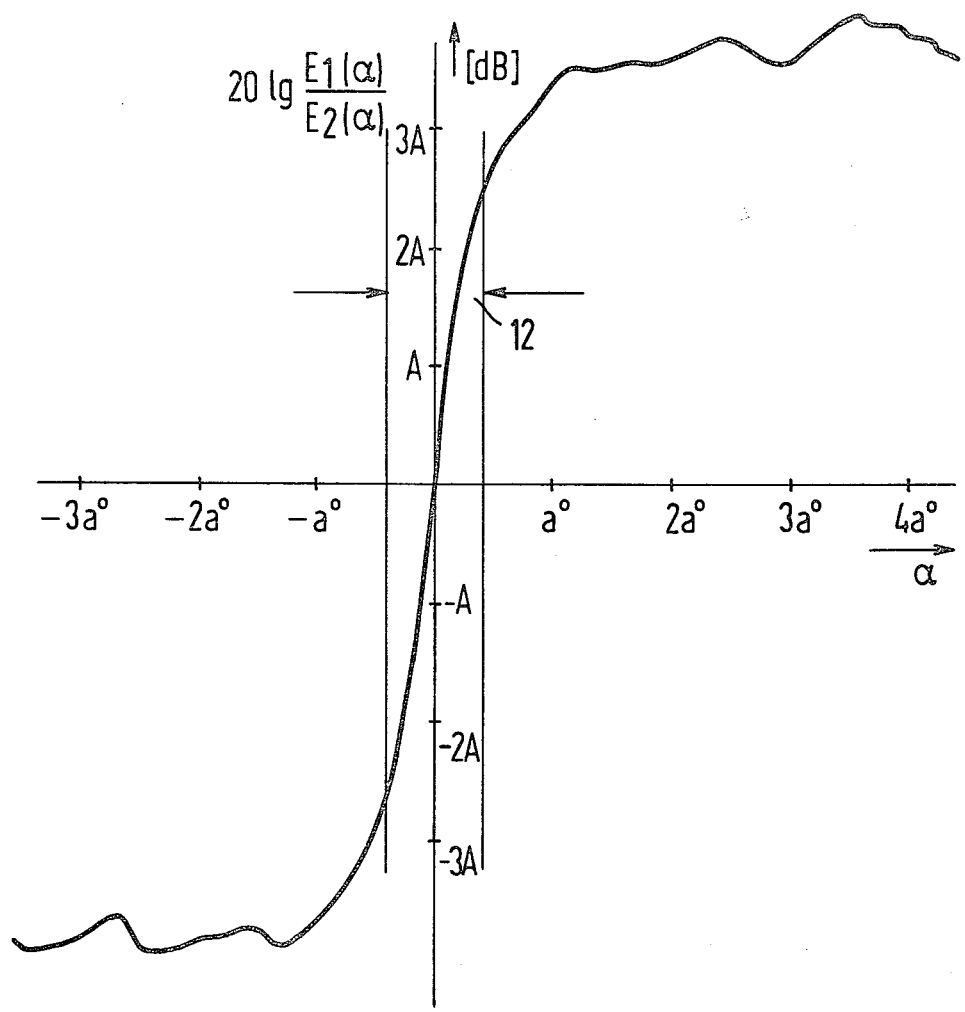

ANTENNA SYSTEM FOR LOCATING A MICROWAVE SIGNAL SOURCE

BACKGROUND OF THE INVENTION

1. Field of the Invention

This invention relates to an antenna system for locating the direction of a signal source emitting microwave signals which utilizes two directional antennas designed for the same frequency and which have principal radiation lobes that are identical but are angularly offset relative to each other in the bearing plane so that the positional angle of the signal source can be determined within the overlap range by the use of signal level comparison or by means of quotient formation of the two received signals received by the two directional antennas.

2. Description of the Prior Art

Such an antenna system is disclosed in German LP No. 807,101. The system disclosed therein has two direction finding receiving antennas and the direction of signals received is identified by means of signal level comparison or by means of a quotient formation from the voltages from the two antennas in the major lobe range. However, overlapping side lobes also arise in the side lobe range of the individual antenna characteristic curves which gives rise to false bearings or ambiguities. With such system, there is no clear directional angle that can be allocated to a specific quotient value derived from the signal sources. Some false bearings and ambiguities can be suppressed by means of a further level comparison using the signals received with an omnidirectional antenna. If the omnidirectional signal level is always greater than the side lobe level of a directional antenna, then the electro-magnetic wave incident from the side lobe antennas is not evaluated for the direction finding. However, such systems require an additional receiver. If only a single receiver is used, the signal levels of the three antennas must be determined in chronological succession and not on a continuous basis.

SUMMARY OF THE INVENTION

The object of the present invention is to provide a system which has less outlay compared to prior art systems for direction finding of a microwave signal source and which has a high degree of suppression of false bearings or ambiguities which arise due to side lobe range of the directional antennas due to overlapping of the side lobes.

This object is achieved in the invention by the use of auxiliary radiators which are associated with each of the two primary directional antennas and the principle radiation direction of the two auxiliary radiators are symmetrically offset relative to each other by respective specified angle to the principle radiation direction of the principle direction antennas in the bearing plane and for the outside and that in each of the principle directional or homing antennas is electrically connected to the associated auxiliary antenna associated with it in a manner such that the received signal voltages will be superimposed in amplitude and phase so as to increase the radiation level on one side relative to the principle radiation direction for each of the principle antennas.

The principle radiation antenna and the associated auxiliary radiator antenna are expediently arranged above each other with their phase centers in relationship to the bearing plane and are interconnected in a suitable manner. The signal voltages received with a principle homing antenna and the auxiliary antenna associated with it are superimposed in amplitude and phase by the use, for example, of a directional coupler or in a combined series or parallel branching circuit with a decoupled branching, as for example, a magic T. The boosted radiation level of one antenna arrangement comprising the one principle homing antenna and the auxiliary radiator allocated to it is always greater over a large angular range outside of the bearing range than the radiation of the other antenna arrangement which is not boosted on the same side with the other antenna arrangement comprising the other principle directional antenna and the auxiliary radiator associated with it.

If as determined by logic, the direction finding is only carried out when given signal level comparison or using quotient formation of the two signals received from the two antenna arrangements, a specific limiting value is not exceeded in amplitude, then all possible bearing in the side lobe range will be substantially suppressed since the boosted radiation level can be selected such that the specific limiting value is exceeded in amplitude. A receiver having two separate amplifier channels can be used for quotient formation. With a signal level comparison being accomplished in chronological succession with a single receiver, the levels of only two high frequency voltages need be compared with the invention.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 5 is a bearing calibration curve for the antenna system illustrated in FIG. 4;

DESCRIPTION OF THE PREFERRED EMBODIMENTS

Figure 1:
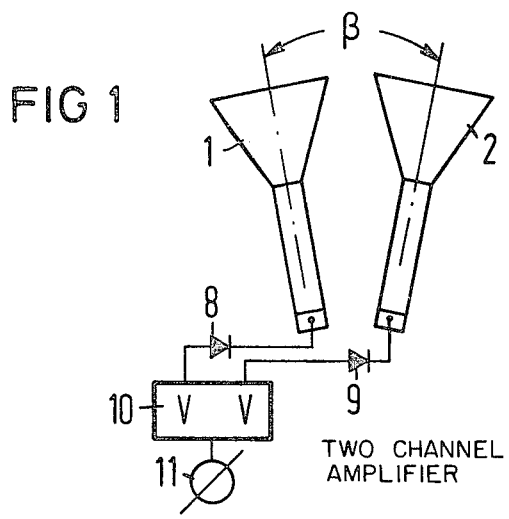
FIG. 1 is a basic diagram of a known antenna system without radiation level boosted on one side.

The antenna system known in the prior art is illustrated in FIG. 1 and consists of two directional antennas 1 and 2 which have their major radiation axis mounted so that they diverge by a specific angle $\beta$ in the bearing plane (azimuth plane) and FIG. 1 is a top plan view of the two directional antennas.

Figure 2:
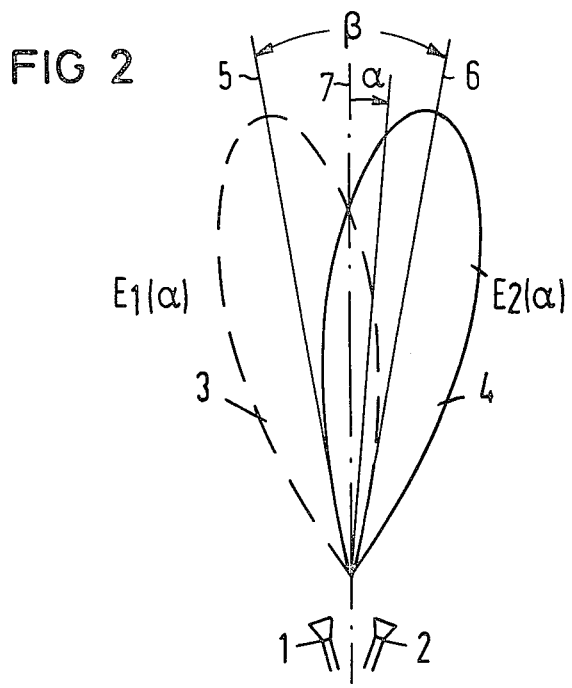
FIG. 2 is a radiation diagram illustrating the two overlapping lobes of the antenna system illustrated in FIG. 1.

The two major lobes 3 and 4 of the antennas 1 and 2 overlap as illustrated in FIG. 2. The principle radiation directions 5 and 6 of the two major lobes 3 and 4 lie apart by a spread angle $\beta$ of approximately 20°. The angle $\alpha$ for a random diagram point of both major lobes 3 and 4 is not referred to the primary radiation direction 5 or 6 but rather to the intersection direction 7 of the two major lobes 3 and 4 as illustrated.

The signal level evaluation of the signals received with the two directional antennas 1 and 2 illustrated in FIG. 1 is accomplished by feeding the outputs of the antennas through respective rectifiers 8 and 9 to a two channel amplifier 10 which supplies an output to a ratio measuring device 11.

With a received signal, which is incident from the intersection direction 7, both directional antennas 1 and 2 will supply identical reception signal levels $E_1(\alpha)$, $E_2(\alpha)$ to the ratio measuring device 11. If the received signals are received from a direction other than the direction 7 then the reception levels $E_1(\alpha)$ and $E_2(\alpha)$ will be different as determined by the characteristic curves of the antenna. The side of the reception signal levels are the ratio formed from these signals thus depends on the azimuth angle $\alpha$. The radio bearing for locating a target is determined utilizing the ratio of $E_1(\alpha)$ and $E_2(\alpha)$. (Where E is the received voltage). A bearing calibration curve can be recorded with the ratio measuring device 11 as a function of the angle $\alpha$.

Figure 3:
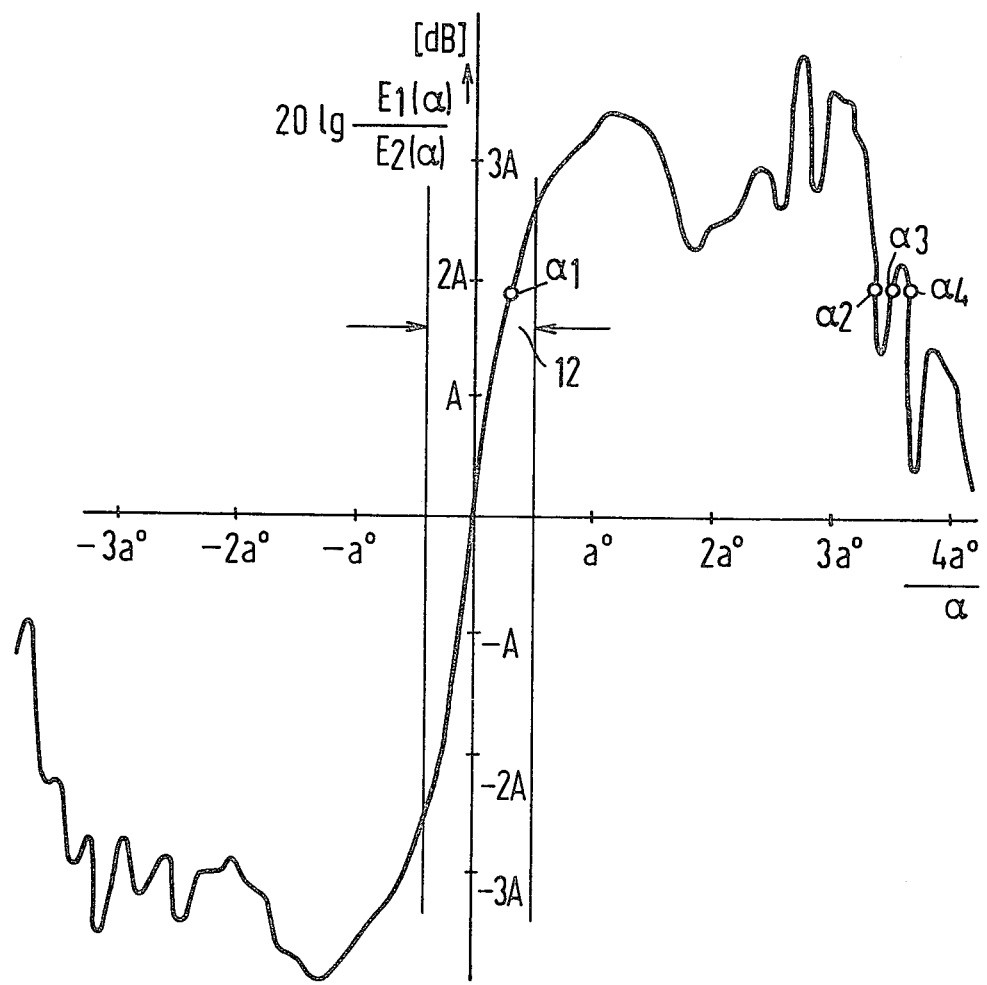
FIG. 3 is a bearing calibration curve for the known antenna system illustrated in FIG. 1.

FIG. 3 illustrates a measured bearing calibration curve utilizing the structure shown in FIG. 1. If the two reception signal levels $E_1$ and $E_2$ of both receiving antennas are measured for a direction of signal incident $\alpha$ and the radio (signal level difference) is formed then the target angle can be determined using the calibration curve. The actual bearing range is indicated by 12. The bearing calibration curve of FIG. 3 shows that two or more radio bearings $\alpha$ can be allocated to the same ratios $E_1/E_2$ illustrated on the abscissa since a plurality of overlap points of the two antenna characteristic curves can occur in the radiation range beyond the major lobe. FIG. 3 indicates an example with the four different radio bearings $\alpha_1$, $\alpha_2$, $\alpha_3$, and $\alpha_4$ at which the same ratio value $E_1/E_2$ are the same. Only the radial bearing $\alpha_1$ however, is located in the actual bearing range 12 and the other bearings are spurious or erroneous bearings. The erroneous bearings are caused by a side lobe bearings.

The present invention eliminates the erroneous bearings caused by side lobe bearing by providing that the radiation level of the directional antennas 1 and 2 are boosted on one side outside of the major lobe by the use of an auxiliary radiating antenna so as to avoid the overlap points of the two radiation characteristic curves beyond the principle radiation direction.

Figure 4:
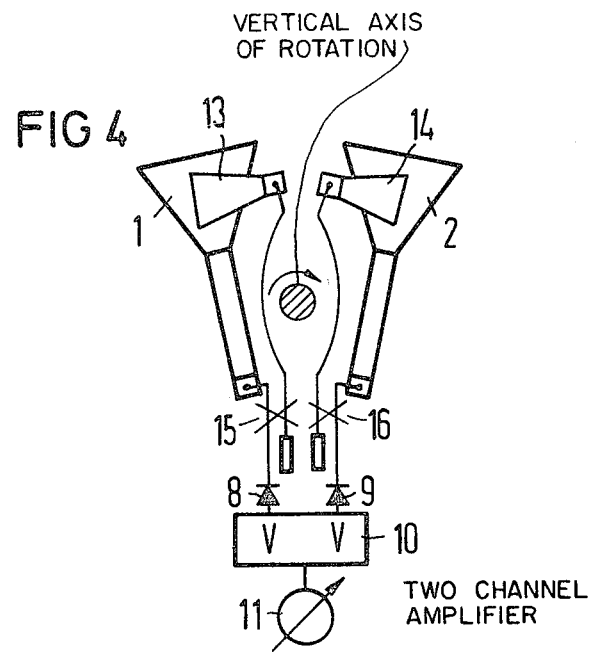
FIG. 4 is the basic circuit diagram of an antenna system with side lobe level being boosted on one side according to the invention.

FIG. 4 illustrates the antenna system according to the invention. A first auxiliary radiator 13 is mounted adjacent the primary directional antenna 1 such that the auxiliary radiator 13 has its primary radiation directly approximately perpendicular to the primary radiation direction of the principle antenna 1. A second auxiliary antenna 14 is mounted so that its radiation direction is substantially right angles to the primary antenna 2 and is mounted adjacent the antenna 2 as shown. The voltages received at the two auxiliary radiators 13 and 14 are respectively superimposed in amplitude and phase on the received voltages of the respective principle antennas 1 and 2 by using the directional couplers 15 and 16, respectively. The electrical different distances caused by the directional couplers can be compensated with adjustable phase shifters. The signal levels of the respective auxiliary radiators 13 or 14 decrease sharply in the major lobe range of the two principle receiving antennas 1 and 2 so that phase synchronization of the two radiation characteristic curves is not required in the invention. This is true in an analogous manner for the major lobe range of the two auxiliary radiators 13 and 14. The phase synchronization is particularly significant for the radiation direction from which on the one side the two primary radiating antennas 1 and 2 and the other side the associated auxiliary radiating antennas 13 and 14 receive identical signal levels. With respect to the signal level evaluation the combined outputs from the antennas 1 and 13 are supplied through a diode 8 to the two channel amplifier 10 and the combined outputs from the antennas 14 and 2 are supplied through the directional coupler 16 and diode 9 to the two channel amplifier 10. The ratio measuring device 11 receives the output of the two channel amplifier 10. It is to be noted that the antennas 13 and 14 point approximately in opposite directions relative to each other in FIG. 4.

FIG. 5 is a plot of the bearing calibration curve of the antenna system according to FIG. 4. As can be observed, there is a single definite directional angle $\alpha$ which corresponds to each specific ratio value $E_1/E_2$ of the two antenna voltages in the range 12 illustrated.

Figure 6:
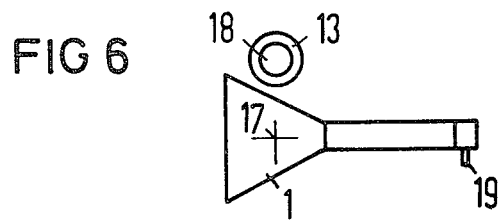
FIG. 6 is a side plan view of an antenna arrangement illustrated in the principle and auxiliary antennas according to the invention.
Figure 7:
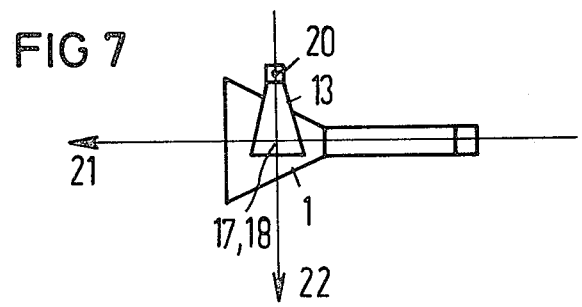
FIG. 7 is a plan view of the antenna arrangement illustrated in FIG. 6.

FIGS. 6 and 7 respectively illustrated a side plan view and a top plan view of the antennas 1 and 13 and a similar arrangement exists for the antennas 2 and 14 with the main axes of the antennas 1 and 2 separated by the angle $\beta$ as in FIG. 1. The main antenna 1 and the auxiliary radiator 13 are mounted above one another with their phase centers 17 and 18 90° to each other relative to the bearing plane. The antenna 1 has an output coupling 19 and the antenna 13 has an output coupling 20 and the two antenna output voltages are supplied to the directional coupler 15 illustrated in FIG. 4. The primary radiation directions 21 and 22 of the primary radiator 1 and the auxiliary radiator 13 lie in the bearing plane and are approximately perpendicular to each other. The details of the antennas 2 and 14 are similar to that illustrated in FIGS. 6 and 7 for the antennas 1 and 13 and are not repeated.

Although the invention has been described with respect to preferred embodiments, it is not to be so limited as changes and modifications may be made therein which are within the full intended scope of the invention as defined by the appended claims.

I claim as my invention:

1. An antenna system for determining the direction of a signal source emitting microwave signals using two primary direction finding antennas designed for the same frequency with major radiation lobes which are identical and are angularly offset with respect to one another in the bearing plane with their major radiation lobes overlapping, so that the bearing direction of the signal source within the overlap range can be determined by means of signal level comparison or by means of ratio formation of the two signal voltages received by said primary antennas, characterized in that an auxiliary radiator (13, 14) is associated with each of the two primary antennas (1, 2) and the primary radiation directions of said two auxiliary radiators (13, 14) in the bearing plane are symmetrically offset by a respective specific angle relative to the primary radiation direction of the associated primary antenna (1, 2) and the primary radiation directions of said auxiliary radiators (13, 14) are in approximate opposite directions and each of the two primary antennas (1, 2) electrically connected to the associated auxiliary radiator (13, 14) such that received signal voltages are superimposed in amplitude and phase to obtain a radiation signal level which is amplified with respect to the primary radiation direction in the bearing plane for each primary antenna.

2. An antenna system according to claim 1, characterized in that a respective primary antenna (1) and the associated auxiliary radiator (13) are arranged above one another with their phase centers (17, 18) lying in the bearing plane.

3. An antenna system according to claim 2, characterized in that the bearing plane is the azimuth plane; the two primary antennas (1, 2) are mounted to rotate in common around a vertical axis of rotation together with the auxiliary radiators (13, 14) associated with them.

4. An antenna system according to claim 1 characterized in that directional couplers respectively electrically interconnect a respective primary antenna (1, 2) to its associated auxiliary radiator (13, 14).

5. An antenna system according to claim 1, characterized in that a combined series or parallel branching with de-coupled branchings, for example a magic T, is provided for the electrical interconnection of a respective primary antenna (1, 2) to the associated auxiliary radiator (13, 14).

6. An antenna system according to claim 1, characterized in that for compensation of different electrical travel distances, an adjustable phase shifter is provided in the signal line to the auxiliary radiator (13) or in the signal line to the primary radiator (1).

7. An antenna system according to claim 1, characterized in that each of the two primary antennas (1, 2) are arranged with respect to the associated auxiliary radiator (13, 14) such that the two primary radiation directions of the antenna and radiator lie approximately perpendicular to one another in the bearing plane.

8. An antenna system according to claim 1, characterized in that, in the signal level comparison or, respectively, in the ratio formation, a specific limiting amplitude value is not exceeded and that the boosted radiation level resulting due to the interconnection of a respective primary antenna (1, 2) with an auxiliary radiator (13, 14) is selected such that the specific limiting value is not exceeded.

* * * * *